United States Patent
Fotak et al.

(10) Patent No.: US 11,971,268 B2
(45) Date of Patent: Apr. 30, 2024

(54) SYSTEMS AND METHODS FOR TRACKING AND EVALUATING FUEL CONSUMPTIONS OF VEHICLES

(71) Applicant: Geotab Inc., Oakville (CA)

(72) Inventors: Meghan Frances Fotak, Mississauga (CA); Weinan Sun, Mississauga (CA); Michael Angelo David Santorelli, Concord (CA); James David Johnston, Temple, GA (US); Ian Grzegorczyk, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/897,643

(22) Filed: Aug. 29, 2022

(65) Prior Publication Data

US 2023/0108703 A1 Apr. 6, 2023

Related U.S. Application Data

(60) Provisional application No. 63/252,889, filed on Oct. 6, 2021.

(51) Int. Cl.
*G01C 21/34* (2006.01)
*G01C 21/36* (2006.01)

(52) U.S. Cl.
CPC ..... *G01C 21/3469* (2013.01); *G01C 21/3605* (2013.01)

(58) Field of Classification Search
None
See application file for complete search history.

(56) References Cited

U.S. PATENT DOCUMENTS

| | | | |
|---|---|---|---|
| 6,092,021 A | 7/2000 | Ehlbeck et al. | |
| 10,040,459 B1 | 8/2018 | Kukreja | |
| 10,423,898 B2 | 9/2019 | Fansler | |
| 10,563,999 B2 | 2/2020 | Davidson | |
| 2011/0276260 A1* | 11/2011 | Sim | G01F 9/023 |
| | | | 701/123 |
| 2017/0263059 A1 | 9/2017 | Davidson | |
| 2017/0363459 A1* | 12/2017 | Kim | G01F 25/20 |
| 2022/0126856 A1 | 4/2022 | Palmer et al. | |
| 2022/0298985 A1* | 9/2022 | Singh | G01F 23/804 |

OTHER PUBLICATIONS

Extended European Search Report for European Application No. 22198626.8, mailed Feb. 22, 2023, 10 Pages.

* cited by examiner

*Primary Examiner* — Hongye Liang
(74) *Attorney, Agent, or Firm* — Lawrence Xin-Tao Yu

(57) ABSTRACT

Systems and methods for tracking and evaluating fuel consumptions of vehicles are provided. The method can involve operating a telematics device installed in the vehicle to: collect fuel data from at least one fuel data source of the vehicle; track, for each fuel data source, a cumulative amount of fuel consumed by the vehicle; determine a confidence level of each fuel data source; identify an initial fuel data source; generate a plurality of mid-trip fuel records; identify a final fuel data source based on a priority of each fuel data source and each confidence level of each fuel data source; determine whether the plurality of mid-trip fuel records is valid; and transmit the plurality of mid-trip fuel records and an indication of whether the plurality of mid-trip fuel records is valid to a fleet management system.

21 Claims, 8 Drawing Sheets

SYSTEMS AND METHODS FOR TRACKING AND EVALUATING FUEL CONSUMPTIONS OF VEHICLES

CROSS-REFERENCE TO RELATED APPLICATIONS

This application claims priority to U.S. Provisional Patent Application No. 63/252,889 filed Oct. 6, 2021 and titled "Intelligent Fuel Economy Comparator", the contents of which are incorporated herein by reference for all purposes.

FIELD

The embodiments described herein generally relate to telematics devices, and in particular, to tracking and evaluating fuel consumptions of vehicles using telematics devices.

BACKGROUND

The following is not an admission that anything discussed below is part of the prior art or part of the common general knowledge of a person skilled in the art.

The fuel economy of a vehicle relates the amount of fuel consumed by the vehicle with the distance traveled by the vehicle. Fuel economy can be expressed in units of fuel per units of distance (e.g., liters per 100 kilometers) or units of distance per units of fuel (e.g., miles per gallon). Fuel economy is a common metric to assess the efficiency and environmental impact of a vehicle. However, fuel economy can be confounded by a number of factors that may be unrelated to the vehicle itself. Furthermore, fuel economy can be difficult to calculate accurately because fuel consumption data is often unavailable or unreliable. Hence, improved telematics devices and methods for tracking and evaluating fuel consumption are needed.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for tracking fuel consumption of a vehicle. The method involves operating a telematics device installed in the vehicle to: collect fuel data from at least one fuel data source of the vehicle during a trip completed by the vehicle; track, during the trip, for each fuel data source, a cumulative amount of fuel consumed by the vehicle determined based on the fuel data collected from that fuel data source; determine a confidence level of each fuel data source at a plurality of points in the trip; identify an initial fuel data source; generate a plurality of mid-trip fuel records, each mid-trip fuel record indicating the cumulative amount of fuel consumed by the vehicle at a point in the trip determined based on the fuel data collected from the initial fuel data source; identify a final fuel data source based on a priority of each fuel data source and each confidence level of each fuel data source; determine whether the plurality of mid-trip fuel records is valid based on whether the initial fuel data source is the same fuel data source as the final fuel data source; and transmit the plurality of mid-trip fuel records and an indication of whether the plurality of mid-trip fuel records is valid to a fleet management system.

In some embodiments, the method can further involve operating the telematics device to: generate a plurality of mid-trip distance records, each mid-trip distance record indicating a cumulative amount of distance traveled by the vehicle at a point in the trip while the cumulative amount of fuel for the initial fuel data source was tracked; and transmit the plurality of mid-trip distance records to the fleet management system.

In some embodiments, the method can further involve operating the telematics device to: generate a trip fuel record, the trip fuel record indicating a cumulative amount of fuel consumed by the vehicle at the end of the trip, the trip fuel record being determined based on the fuel data collected from the final fuel data source; and transmit the trip fuel record to the fleet management system.

In some embodiments, the method can further involve operating the telematics device to: generate a trip distance record, the trip distance record indicating a cumulative distance traveled by the vehicle at the end of the trip while the cumulative amount of fuel for the final fuel data source was tracked; and transmit the trip distance record to the fleet management system.

In some embodiments, the method can further involve operating the telematics device to: identify one or more fuel data sources having a confidence level exceeding a predetermined validation threshold as one or more validated fuel data sources; and identify the validated fuel data source having the highest priority as the initial fuel data source.

In some embodiments, identifying the initial fuel data source can involve identifying a previous final fuel data source from a previous trip as the initial fuel data source.

In some embodiments, identifying the final fuel data source can involve: determining an overall confidence level for each fuel data source based on the confidence level for that fuel data source at each point in the plurality of points; and identifying the fuel data source having the highest priority and an overall confidence level exceeding a predetermined validation threshold as the final fuel data source.

In some embodiments the confidence level of the final fuel data source can exceed a predetermined validation threshold at each point in the plurality of points.

In some embodiments, the method can further involve operating the telematics device to: determine that the confidence level for the initial fuel data source is below a predetermined validation threshold at at least one point in the trip; and determine that the plurality of mid-trip fuel records is not valid.

In some embodiments, at least a portion of the mid-trip fuel records can be transmitted to the fleet management system prior to identifying the final fuel data source.

In some embodiments, the method can further involve operating the telematics device to: detect the at least one fuel data source from a plurality of predetermined potential fuel data sources prior to collecting the fuel data.

In some embodiments, the method can further involve operating the telematics device to: determine that the initial fuel data source was detected subsequent to the beginning of the trip; the indication of whether the plurality of mid-trip fuel records is valid can indicate that the initial fuel data source was identified subsequent to the beginning of the trip.

In some embodiments, the initial fuel data source can be the same fuel data source as the final fuel data source; and the plurality of mid-trip fuel records can be determined to be valid.

In some embodiments, the initial fuel data source can not be the same fuel data source as the final fuel data source; and the plurality of mid-trip fuel records can be determined to be not valid.

In some embodiments, the fleet management system can be remotely located from the telematics device and the vehicle.

In some embodiments, the method can further involve operating the fleet management system to determine a fuel economy of the vehicle based on the at least a portion of the plurality of mid-trip fuel records.

In some embodiments, each mid-trip fuel record can indicate a cumulative amount of fuel consumed by the vehicle while the vehicle is idling.

In accordance with a broad aspect, there is provided a non-transitory computer readable medium having instructions stored thereon executable by at least one processor to implement a method for tracking fuel consumption of a vehicle. The method involves operating a telematics device installed in the vehicle to: collect fuel data from at least one fuel data source of the vehicle during a trip completed by the vehicle; track, during the trip, for each fuel data source, a cumulative amount of fuel consumed by the vehicle determined based on the fuel data collected from that fuel data source; determine a confidence level of each fuel data source at a plurality of points in the trip; identify an initial fuel data source; generate a plurality of mid-trip fuel records, each mid-trip fuel record indicating the cumulative amount of fuel consumed by the vehicle at a point in the trip determined based on the fuel data collected from the initial fuel data source; identify a final fuel data source based on a priority of each fuel data source and each confidence level of each fuel data source; determine whether the plurality of mid-trip fuel records is valid based on whether the initial fuel data source is the same fuel data source as the final fuel data source; and transmit the plurality of mid-trip fuel records and an indication of whether the plurality of mid-trip fuel records is valid to a fleet management system.

In accordance with a broad aspect, there is provided a telematics device. The telematics device includes at least one processor operable to: collect fuel data from at least one fuel data source of the vehicle during a trip completed by the vehicle; track, during the trip, for each fuel data source, a cumulative amount of fuel consumed by the vehicle determined based on the fuel data collected from that fuel data source; determine a confidence level of each fuel data source at a plurality of points in the trip; identify an initial fuel data source; generate a plurality of mid-trip fuel records, each mid-trip fuel record indicating the cumulative amount of fuel consumed by the vehicle at a point in the trip determined based on the fuel data collected from the initial fuel data source; identify a final fuel data source based on a priority of each fuel data source and each confidence level of each fuel data source; determine whether the plurality of mid-trip fuel records is valid based on whether the initial fuel data source is the same fuel data source as the final fuel data source; and transmit the plurality of mid-trip fuel records and an indication of whether the plurality of mid-trip fuel records is valid to a fleet management system.

In some embodiments, the at least one processor operable can be operable to: generate a plurality of mid-trip distance records, each mid-trip distance record indicating a cumulative amount of distance traveled by the vehicle at a point in the trip while the cumulative amount of fuel for the initial fuel data source was tracked; and transmit the plurality of mid-trip distance records to the fleet management system.

In some embodiments, the at least one processor operable can be operable to: generate a trip fuel record, the trip fuel record indicating a cumulative amount of fuel consumed by the vehicle at the end of the trip, the trip fuel record being determined based on the fuel data collected from the final fuel data source; and transmit the trip fuel record to the fleet management system.

In some embodiments, the at least one processor operable can be operable to: generate a trip distance record, the trip distance record indicating a cumulative distance traveled by the vehicle at the end of the trip while the cumulative amount of fuel for the final fuel data source was tracked; and transmit the trip distance record to the fleet management system.

In some embodiments, the at least one processor operable can be operable to: identify one or more fuel data sources having a confidence level exceeding a predetermined validation threshold as one or more validated fuel data sources; and identify the validated fuel data source having the highest priority as the initial fuel data source.

In some embodiments, identifying the initial fuel data source can involve identifying a previous final fuel data source from a previous trip as the initial fuel data source.

In some embodiments, identifying the final fuel data source can involve: determining an overall confidence level for each fuel data source based on the confidence level for that fuel data source at each point in the plurality of points; and identifying the fuel data source having the highest priority and an overall confidence level exceeding a predetermined validation threshold as the final fuel data source.

In some embodiments, the confidence level of the final fuel data source can exceed a predetermined validation threshold at each point in the plurality of points.

In some embodiments, the at least one processor operable can be operable to: determine that the confidence level for the initial fuel data source is below a predetermined validation threshold at at least one point in the trip; and determine that the plurality of mid-trip fuel records is not valid.

In some embodiments, at least a portion of the mid-trip fuel records can be transmitted to the fleet management system prior to identifying the final fuel data source.

In some embodiments, the at least one processor operable can be operable to: detect the at least one fuel data source from a plurality of predetermined potential fuel data sources prior to collecting the fuel data.

In some embodiments, the at least one processor operable can be operable to: determine that the initial fuel data source was detected subsequent to the beginning of the trip; the indication of whether the plurality of mid-trip fuel records is valid can indicate that the initial fuel data source was identified subsequent to the beginning of the trip.

In some embodiments, the initial fuel data source can be the same fuel data source as the final fuel data source; and the plurality of mid-trip fuel records can be determined to be valid.

In some embodiments, the initial fuel data source can not be the same fuel data source as the final fuel data source; and the plurality of mid-trip fuel records can be determined to be not valid.

In some embodiments, the fleet management system can be remotely located from the telematics device and the vehicle.

In some embodiments, the fleet management system can be operable to determine a fuel economy of the vehicle based on the at least a portion of the plurality of mid-trip fuel records.

In some embodiments, each mid-trip fuel record can indicate a cumulative amount of fuel consumed by the vehicle while the vehicle is idling.

In accordance with a broad aspect, there is provided a method for evaluating fuel consumption of a vehicle. The method involves operating at least one processor to: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; identify a plurality of comparable vehicles having at least one shared vehicle characteristic with the vehicle; and determine a fuel economy score of the vehicle based on differences between the fuel economy of the vehicle and a fuel economy of each comparable vehicle in the plurality of comparable vehicles.

In some embodiments, the fuel health score of the vehicle can be determined based on a percentile rank of the fuel economy of the vehicle in relation to the fuel economy of each comparable vehicle in the plurality of comparable vehicles.

In some embodiments, the at least one shared vehicle characteristic can include vocation, fuel type, weight class, and/or engine characteristic.

In some embodiments, at least some of the trips in the plurality of trips completed by the vehicle can be identified based on ignition events in the telematics data.

In some embodiments, the distance data can include GPS data and/or odometer data.

In some embodiments, classifying the at least some of the plurality of trips as fuel supported trips can involve determining that the fuel consumption data in the portion of the telematics data associated with the trip is valid.

In some embodiments, the fuel consumption data of each fuel supported trip can be substantially cotemporaneous to the corresponding distance data.

In some embodiments, the method can further involve operating the at least one processor to: determine, based the telematics data, an amount of idling performed by the vehicle during the at least a portion of each fuel supported trip; and generate a warning indicating the amount of idling in response to determining that the fuel health score and the amount of idling exceed a predetermined idling threshold.

In some embodiments, the method can further involve operating the at least one processor to: determine, based the telematics data, an amount of aggressive driving performed by the vehicle during the at least a portion of each fuel supported trip; and generate a warning indicating the amount of aggressive driving, in response to determining that the fuel health score and the amount of aggressive driving exceed a predetermined aggressive driving threshold.

In some embodiments, the method can further involve operating the at least one processor to: determine, based the telematics data, an amount of idling performed by the vehicle during the at least a portion of each fuel supported trip; determine, based the telematics data, an amount of aggressive driving performed by the vehicle during the at least a portion of each fuel supported trip; and identify a mechanical issue with the vehicle based on the fuel health score, the amount of idling, and the amount of aggressive driving.

In some embodiments, the method can further involve operating the at least one processor to: for each comparable vehicle in the plurality of comparable vehicles: retrieve telematics data associated with the comparable vehicle, the telematics data collected by a telematics device installed in the comparable vehicle during operation of the comparable vehicle; identify a plurality of trips completed by the comparable vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the comparable vehicle during at least a portion of the trip; identify, from the portion of the telematics data associated with each fuel supported trip, distance data corresponding to the fuel consumption data, the distance data representing an amount of distance traveled by the comparable vehicle during the at least a portion of the trip; and calculate a fuel economy of the comparable vehicle based on the fuel consumption data and the distance data of each fuel supported trip.

In some embodiments, the at least one processor can be remotely located from the telematics device and the vehicle.

In accordance with a broad aspect, there is provided a method for evaluating fuel consumption for a plurality of vehicles. The method involves operating at least one processor to: for each vehicle in the plurality of vehicles: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; and determine a fuel health score of the vehicle based on differences between the fuel economy of the vehicle and the fuel economy of each other vehicle in the plurality of vehicles.

In accordance with a broad aspect, there is provided a non-transitory computer readable medium having instructions stored thereon executable by at least one processor to implement a method for evaluating fuel consumption of a vehicle. The method involves operating the at least one processor to: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; identify a plurality of comparable vehicles having at least one shared vehicle characteristic with the vehicle; and determine a fuel economy score of the vehicle based on differences between the fuel economy of the vehicle and a fuel economy of each comparable vehicle in the plurality of comparable vehicles.

In accordance with a broad aspect, there is provided a non-transitory computer readable medium having instructions stored thereon executable by at least one processor to implement a method for evaluating fuel consumption for a plurality of vehicles. The method involves operating the at least one processor to: for each vehicle in the plurality of vehicles: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; and determine a fuel health score of the vehicle based on differences between the fuel economy of the vehicle and the fuel economy of each other vehicle in the plurality of vehicles.

In accordance with a broad aspect, there is provided a system for evaluating fuel consumption of a vehicle. The system includes: at least one processor operable to: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; identify a plurality of comparable vehicles having at least one shared vehicle characteristic with the vehicle; and determine a fuel economy score of the vehicle based on differences between the fuel economy of the vehicle and a fuel economy of each comparable vehicle in the plurality of comparable vehicles.

In some embodiments, the fuel health score of the vehicle can be determined based on a percentile rank of the fuel economy of the vehicle in relation to the fuel economy of each comparable vehicle in the plurality of comparable vehicles.

In some embodiments, the at least one shared vehicle characteristic can include vocation, fuel type, weight class, and/or engine characteristic.

In some embodiments, at least some of the trips in the plurality of trips completed by the vehicle can be identified based on ignition events in the telematics data.

In some embodiments, the distance data can include GPS data and/or odometer data.

In some embodiments, classifying the at least some of the plurality of trips as fuel supported trips can involve determining that the fuel consumption data in the portion of the telematics data associated with the trip is valid.

In some embodiments, the fuel consumption data of each fuel supported trip can be substantially cotemporaneous to the corresponding distance data.

In some embodiments, the at least one processor can be operable to: determine, based the telematics data, an amount of idling performed by the vehicle during the at least a portion of each fuel supported trip; and generate a warning indicating the amount of idling in response to determining that the fuel health score and the amount of idling exceed a predetermined idling threshold.

In some embodiments, the at least one processor can be operable to: determine, based the telematics data, an amount of aggressive driving performed by the vehicle during the at least a portion of each fuel supported trip; and generate a warning indicating the amount of aggressive driving, in response to determining that the fuel health score and the amount of aggressive driving exceed a predetermined aggressive driving threshold.

In some embodiments, the at least one processor can be operable to: determine, based the telematics data, an amount of idling performed by the vehicle during the at least a portion of each fuel supported trip; determine, based the telematics data, an amount of aggressive driving performed by the vehicle during the at least a portion of each fuel supported trip; and identify a mechanical issue with the vehicle based on the fuel health score, the amount of idling, and the amount of aggressive driving.

In some embodiments, the at least one processor can be operable to: for each comparable vehicle in the plurality of comparable vehicles: retrieve telematics data associated with the comparable vehicle, the telematics data collected by a telematics device installed in the comparable vehicle during operation of the comparable vehicle; identify a plurality of trips completed by the comparable vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the comparable vehicle during at least a portion of the trip; identify, from the portion of the telematics data associated with each fuel supported trip, distance data corresponding to the fuel consumption data, the distance data representing an amount of distance traveled by the comparable vehicle during the at least a portion of the trip; and calculate a fuel economy of the comparable vehicle based on the fuel consumption data and the distance data of each fuel supported trip.

In some embodiments, the at least one processor can be remotely located from the telematics device and the vehicle.

In accordance with a broad aspect, there is provided a system for evaluating fuel consumption of a vehicle. The system includes: at least one processor operable to: for each vehicle in the plurality of vehicles: retrieve telematics data associated with the vehicle, the telematics data collected by a telematics device installed in the vehicle during operation of the vehicle; identify a plurality of trips completed by the vehicle based on the telematics data, each trip associated with a portion of the telematics data collected during the trip; classify at least some of the plurality of trips as fuel supported trips, the portion of the telematics data associated with each fuel supported trip including fuel consumption data, the fuel consumption data representing an amount of fuel consumed by the vehicle during at least a portion of the trip; identify, from the portion of the telematics data associated with each fuel supported trip, distance data corresponding to the fuel consumption data, the distance data representing an amount of distance traveled by the vehicle during the at least a portion of the trip; calculate a fuel economy of the vehicle based on the fuel consumption data and the distance data of each fuel supported trip; and determine a fuel health score of the vehicle based on differences between the fuel economy of the vehicle and the fuel economy of each other vehicle in the plurality of vehicles.

BRIEF DESCRIPTION OF THE DRAWINGS

Several embodiments will be described in detail with reference to the drawings, in which.

Figure 1:
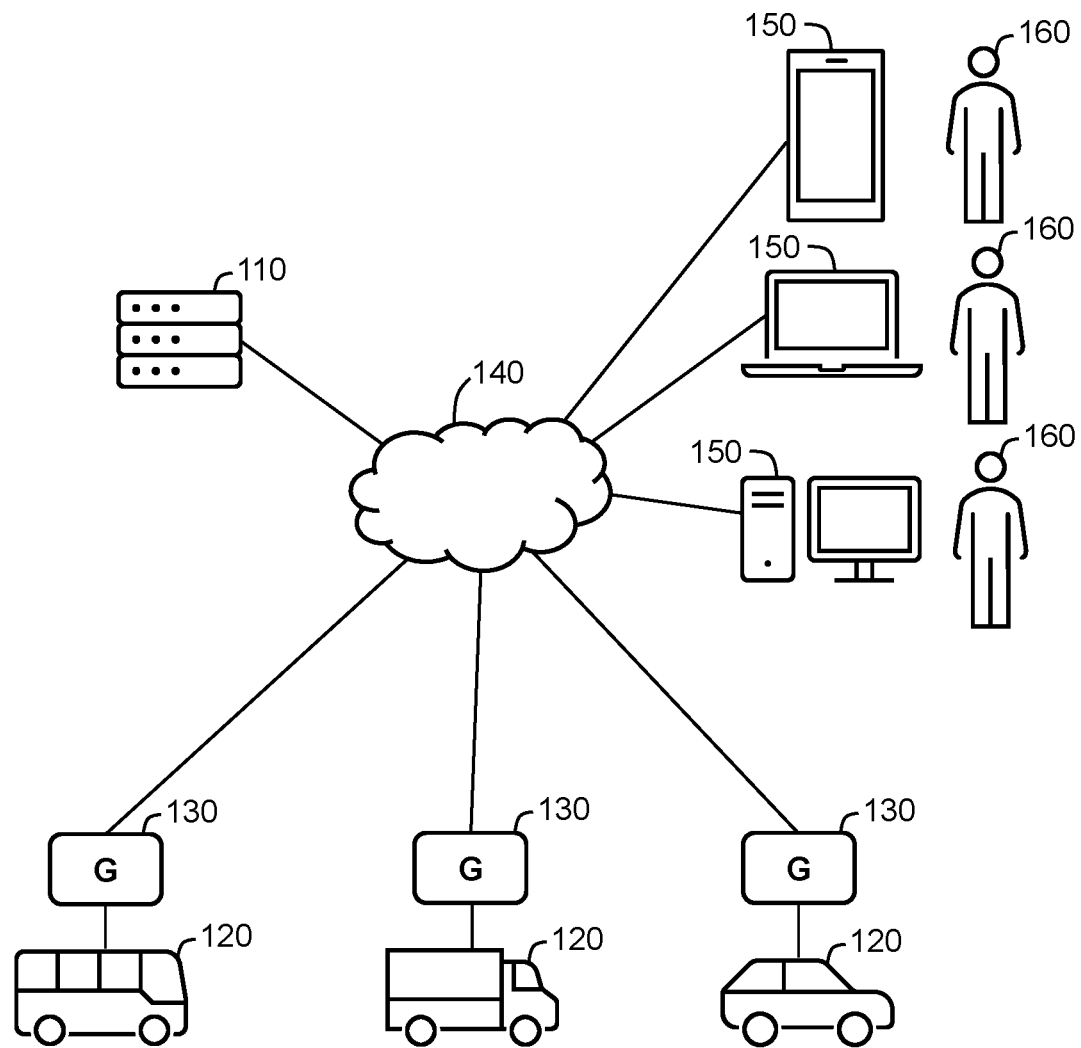
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120. The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
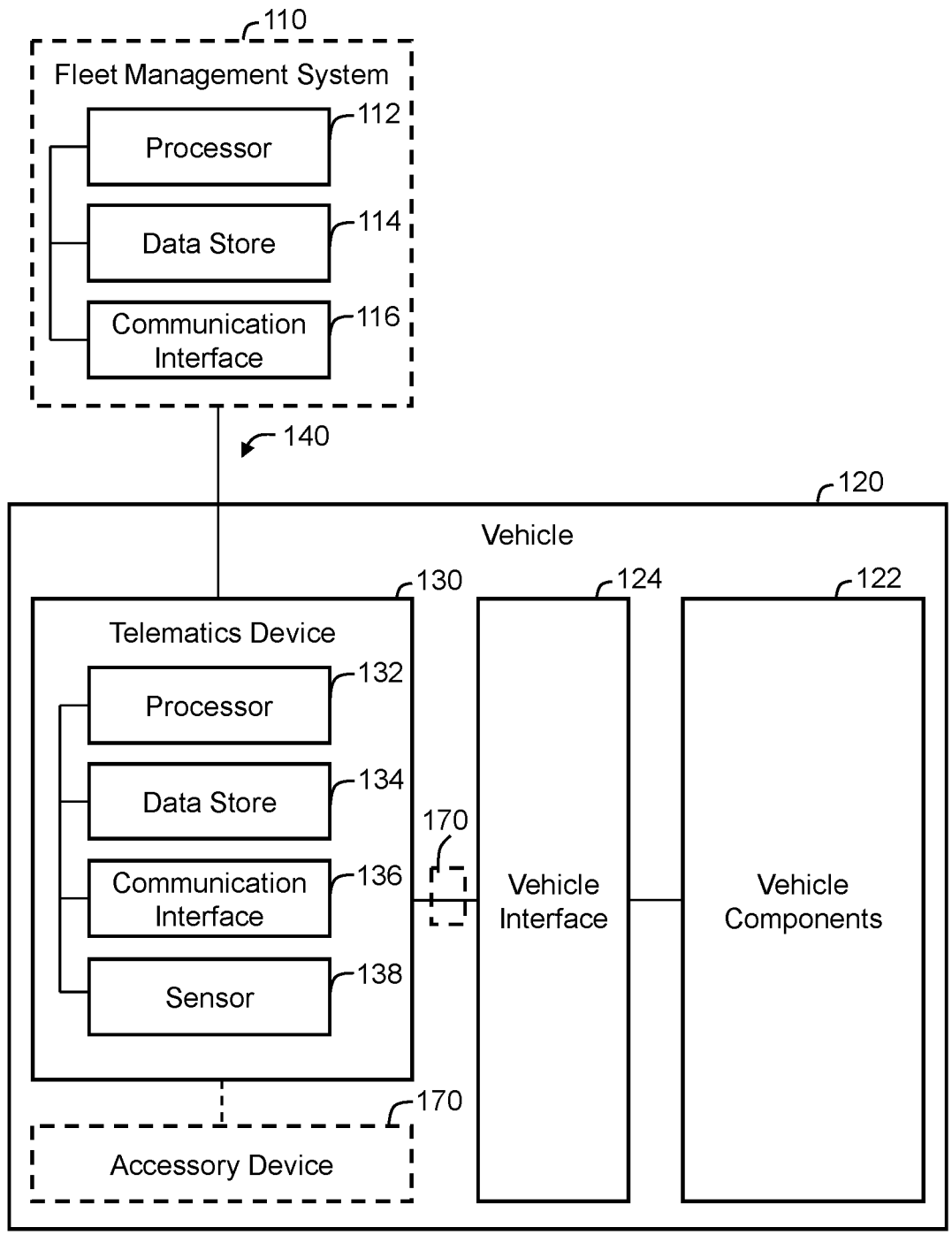
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data storages 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data storage 114 to implement various methods described herein. For example, the processors 112 may process various telematics data collected by the fleet management system 110 from the telematics device 130.

The data storages 114 can store various data for the fleet management system 110. The data storages 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storages 114 may include volatile memory, non-volatile memory, or a combination thereof. The data storages 114 may include non-transitory computer readable media. The data storages 114 can store various computer instructions, programs, and/or software that can be executed by the processors 112 to implement various methods described herein. The data storages 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data storages 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data storages 134. For example, the processors 132 can process various telematics data gathered from the vehicle components 122 or the sensors 138.

The data storages 134 can store various data for the telematics device 130. Like the data storages 114 of the fleet management system 110, the data storages 134 of the telematics device 130 can be implemented using any suitable data storage devices or systems. The data storages 134 can store various computer instructions, programs, and/or software that can be executed by the processors 132. The data storages 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
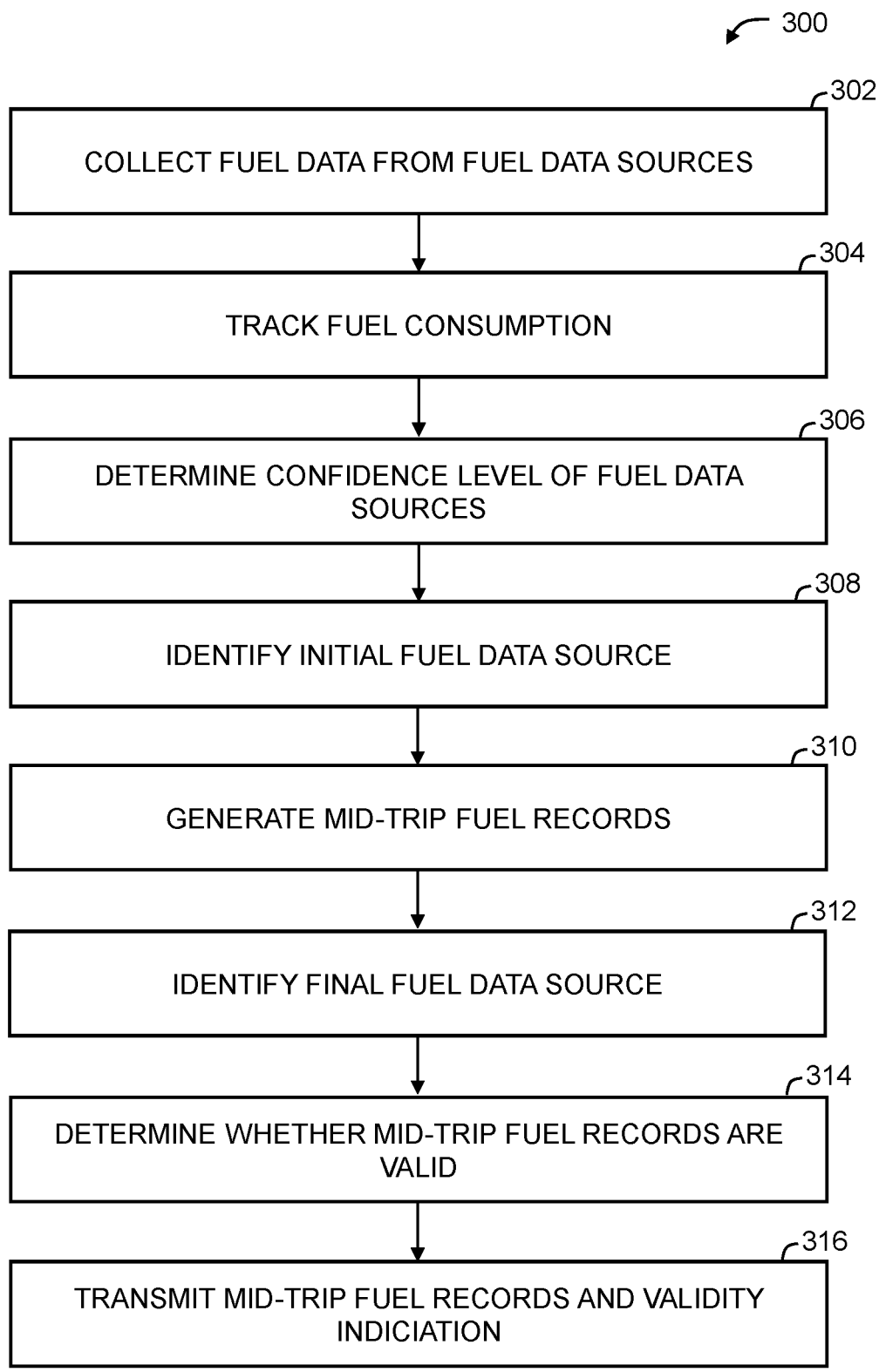
FIG. 3 is a flowchart of an example method for tracking fuel consumption of a vehicle, in accordance with an embodiment.

Reference will now be made to FIG. 3, which illustrates an example method for tracking fuel consumption of a vehicle 120. Method 300 can be implemented using a telematics device 130 (e.g., at least one processor 132) installed in the vehicle 120. For example, method 300 can be implemented by processor 132 executing instructions stored on data storage 134. An advantage of executing one or more steps of method 300 at the telematics device 130 (i.e., remote from the fleet management system 110) is that less data may be transmitted between the fleet management system 110 and the telematics device 130. Hence, network usage and bandwidth on the network 140 can be reduced. This may reduce usage costs associated with the network 140.

At 302, fuel data can be collected. The fuel data can include any data from which the amount of fuel consumed by the vehicle 120 can be determined, directly or indirectly. In some cases, the fuel data may include data that directly represents the total amount of fuel consumed by the vehicle 120. In other cases, the fuel data may include data that represents another parameter from which the amount of fuel consumed by the vehicle 120 can be determined. For example, the fuel data may include data that represents a fuel flow rate, which can be integrated to determine the amount of fuel consumed by the vehicle 120. As another example, the fuel data may include data that represents an air flow rate, which can be multiplied by a stoichiometric ratio and fuel density and integrated to determine the amount of fuel consumed by the vehicle 120. As a further example, the fuel data may include data that represents an engine speed and injection quantity, which can be multiplied and integrated to determine the amount of fuel consumed by the vehicle 120.

The fuel data can be collected during a trip completed by the vehicle 120. The trip can be defined by an origin and a destination. During the trip, the vehicle can travel from the origin to the destination. The origin and destination may be the same location or different locations. The trip can encompass any amount of time or distance. The fuel data can be collected at any point in the trip, including the origin and the destination. The fuel data can be collected continuously, regularly, or intermittently during the trip. The origin and the destination can be defined in various ways. In some cases, the origin and the destination can be defined based on when the ignition of the vehicle 120 was turned on and off respectively. In other cases, the origin and the destination can be defined based on the motion (or lack thereof) of the vehicle 120.

The fuel data can be collected from at least one fuel data source of the vehicle 120. The vehicle 120 can include a plurality of fuel data sources. Different fuel data sources can provide different types of fuel data. The fuel data sources can correspond to various sensors, ECUs (electronic control units), or other embedded systems of the vehicle 120. For instance, various fuel data sources may correspond to fuel level sensors, fuel flow rate sensors, air flow rate sensors, engine speed sensors, etc. The fuel data can be collected from one or more vehicle interfaces 124, such as, but not limited to, one or more ODB-II (on-board diagnostics) ports and/or CAN (controller area network) buses. In some cases, the fuel data sources may transmit fuel data over a vehicle interface 124 in response to a request made by the telematics device 130. In other cases, the fuel data sources may independently broadcast the fuel data over the vehicle interface 124. Different vehicles 120 may have different fuel data sources. A fuel data source present at a particular vehicle 120 may not be present at another vehicle 120.

The at least one fuel data source can be detected prior to collecting the fuel data. The at least one fuel data source can be detected during the trip, or during a previous trip completed by the vehicle 120. Fuel data sources can be detected in various ways. In some cases, a fuel data source can be detected by searching for the presence of broadcasted fuel data at a vehicle interface 124. The fuel data source can be identified based on one or more identifiers present in the broadcasted fuel data. For example, for fuel data broadcast over a CAN (controller area network) bus, the fuel data source can be identified based on the arbitration identifier in the CAN bus messages. In other cases, a fuel data source can be detected by attempting to request fuel data from one or more fuel data sources. For example, a fuel data source may be detected when a response is received to the request made by the telematics device 130. In various embodiments, the at least one fuel data source may be detected based on a plurality of predetermined potential fuel data sources. The plurality of predetermined potential fuel data sources may include various fuel data sources that have been previously identified as fuel data sources. The predetermined potential fuel data sources may include fuel data sources that have been previously found in the vehicle 120, other vehicles 120 that are similar to the vehicle 120 (e.g., same make, model, year, and/or manufacturer), and/or other vehicles 120 that are dissimilar to the vehicle (e.g., different make, model, year, and/or manufacturer).

At 304, cumulative amounts of fuel consumed by the vehicle 120 can be tracked during the trip. Each cumulative amount of fuel can represent a running total of the fuel consumed by the vehicle 120. A cumulative amount of fuel can be tracked for each fuel data source. The cumulative amount of fuel tracked for each fuel data source can be determined based on the fuel data collected from that fuel data source. Since different fuel data sources can provide different fuel data, the cumulative amounts of fuel may differ from each other. For example, a first cumulative amount of fuel can be tracked that is determined based on total fuel data, a second cumulative amount of fuel can be tracked that is determined based on fuel flow rate data, a third cumulative amount of fuel can be tracked that is determined based on air flow rate data, a fourth cumulative amount of fuel can be tracked that is determined based on engine speed and injection quantity data, etc. As fuel data is collected from each fuel data source during the trip, each cumulative amount of fuel can be updated. The cumulative amounts of fuel can generally be tracked at any point in the trip. However, if a fuel data source is detected late (i.e., subsequent to the beginning of the trip) the resulting cumulative amount of fuel may be less than the actual amount of fuel consumed.

At 306, confidence levels for each fuel data source can be determined. A confidence level can be determined at a plurality of points in the trip for each fuel data source. Each confidence level can represent a level of certainty at a particular point in the trip that the fuel data collected from a particular fuel data source can be used to determine fuel consumption accurately. The confidence levels can be used to select fuel data sources at various points in the trip.

The confidence levels can be determined in various ways. In some cases, the confidence level for a fuel data source can be determined based on a correlation between the cumulative amount of fuel for that fuel data source and a related property of the vehicle 120. Various related properties of the vehicle 120 can be correlated with the cumulative amount of fuel, such as, but not limited to, the air pressure of the vehicle's engine's intake manifold, engine load, engine speed, etc. Various techniques can be used to determine the correlation, such as, but not limited to, the Pearson correlation coefficient. A strong correlation with a related property of the vehicle 120 may indicate a high confidence level, whereas a weaker correlation may indicate a lower confidence level. For example, a relatively high confidence level may be assigned to a fuel data source if the cumulative amount of fuel is strongly correlated with engine load, since the cumulative amount of fuel is expected to increase as the engine load increases and decrease as the engine load decreases.

At 308, an initial fuel data source is identified. The initial fuel data source can represent the best fuel data source for determining the fuel consumption of the vehicle 120 at an initial point in the trip. The initial point in the trip can be at or near the beginning of the trip. Fuel data collected from the initial fuel data source can be used to generate fuel records during the trip (i.e., mid-trip fuel records), prior to selecting a final fuel data source at the end of the trip.

The initial fuel data source can be identified in various ways. In some cases, the initial fuel data source can be identified based on the final fuel data source from a previous trip. That is, the final fuel data source from a previous trip can be identified as the initial fuel data source. In other cases, the initial fuel data source can be identified based on at least one confidence level of each fuel data source. For example, the initial fuel data source may be identified based the confidence level of each fuel data source at one or more initial points in the trip. In some cases, the initial fuel data source may also be identified based on a priority of each fuel data source. For example, one or more fuel data sources having at least one confidence level exceeding a predetermined validation threshold can be identified as one or more validated fuel data sources. The initial fuel data source can be identified as the validated fuel data source having the highest priority. The priority of each fuel data source can be predetermined and represent a reliability ranking of that fuel data source. For example, a fuel data source that directly provides total fuel data may be assigned a higher priority than a fuel data source that provides other data from which fuel consumption can be determined, such as, but not limited to, air pressure data, engine speed data, etc.

At 310, a plurality of mid-trip fuel records can be generated. Each mid-trip fuel record can indicate the cumulative amount of fuel consumed by the vehicle 120 at a point in the trip. The cumulative amount of fuel indicated by each mid-trip fuel record can be determined by the fuel data collected from the initial fuel data source. Hence, the plurality of mid-trip fuel records can be generated prior to identifying the final fuel data source at the end of the trip. In some cases, a mid-trip fuel record may not be generated if the confidence level of the initial fuel data source falls below a predetermined validation threshold.

A plurality of mid-trip distance records can also be generated. Each mid-trip distance record can indicate a cumulative amount of distance traveled by the vehicle at a point in the trip while the cumulative amount of fuel for the initial fuel data source was tracked. The mid-trip distance records may or may not correspond to the same points in the trip as the mid-trip fuel records. The mid-trip distance records may not include distances traveled by the vehicle while fuel data from the initial fuel data source was not collected. Distance records that consider when fuel consumption was tracked during a trip can improve the accuracy of fuel economy calculations. Absent such consideration, overestimation of fuel economy can occur where fuel consumption is not tracked for the entire trip (e.g., near the start of a trip due to delays in validating or detecting a fuel data source).

At 312, a final fuel data source can be identified. The final fuel data source can represent the best fuel data source for determining fuel consumption at the end of the trip. The final fuel data source can be determined based all of the confidence levels for each fuel data source. This can include confidence levels at points in the trip that occurred after the initial fuel data source was identified and were not available when identifying the initial fuel data source. The final fuel data source can also be identified based on the priority of each fuel data source. For example, an overall confidence level can be determined for each fuel data source based on the confidence level for that fuel data source at each point in the plurality of points. The fuel data source having the highest priority and an overall confidence level exceeding a predetermined validation threshold can be identified as the final fuel data source. The confidence level of the final fuel data source may exceed a predetermined validation threshold at each point in the plurality of points.

At 314, the validity of the plurality of mid-trip fuel records can be determined. The validity of the mid-trip records may be evaluated in various ways. In some embodiments, the validity of the mid-trip records can be determined based on whether the initial fuel data source is the same fuel data source as the final fuel data source. If the initial fuel data source is the same fuel data source as the final fuel data source, the plurality of mid-trip fuel records can be determined to be valid. However, if the initial fuel data source is not the same fuel data source as the final fuel data source, the plurality of mid-trip fuel records can be determined to be not valid. The final fuel data source being a different fuel data source from the initial fuel data source can indicate that a better fuel data source was discovered after identifying the initial fuel data source.

In some embodiments, the validity of the mid-trip records can be determined based on the confidence levels of the initial fuel data source. For example, the plurality of mid-trip records can be determined to be not valid if it is determined that the confidence level for the initial fuel data source is below a predetermined validation threshold at at least one point in the trip. In some cases, the plurality of mid-trip records can be determined to be valid if the confidence level for the initial fuel data source is above the predetermined validation threshold for each point in the plurality of points, regardless of whether the initial fuel data source is the same fuel data source as the final fuel data source.

At 316, the plurality of mid-trip fuel records can be transmitted to a fleet management system 110. The plurality of mid-trip distance records can also be transmitted to the fleet management system 110. At least a portion of the mid-trip records can be transmitted to the fleet management system 110 prior to identifying the final fuel data source. In other words, various mid-trip records can be transmitted during the trip, in real time, as various data is collected from the vehicle 120.

The mid-trip records (or a portion thereof) can be used by the fleet management system 110 to determine the fuel economy of the vehicle 120. An advantage of using the mid-trip records is that the fuel economy of the vehicle 120 can be determined for any portion of the trip. Hence, a single trip can be split into multiple trips, or portions of multiple trips can be combined into a single trip. Splitting or combing trips can be useful when converting between different trip definitions. For example, the fleet management system 110 may have a different definition of a trip as compared to the telematics device 130. As another example, a trip definition may vary depending on the time zone or location of the vehicle 120. Trip definitions may differ across jurisdictions due to regulatory requirements or user preferences.

An indication of whether the plurality of mid-trip records is valid can also be transmitted to the fleet management system 110. The indication can be used by the fleet management system 110 to determine whether the mid-trip records can be used to determine the fuel economy of the vehicle 120. In some cases, the indication may also indicate that the initial fuel data source was identified subsequent to the beginning of the trip. In such cases, the fleet management system 110 may use a portion of the mid-trip records (e.g., corresponding to points in the trip subsequent to identifying the initial fuel data source) to determine the fuel economy of the vehicle 120 for that portion of the trip.

In some embodiments, various trip records can also be generated and transmitted to the fleet management system 110. The trip records can include trip fuel records and trip distance records. A trip fuel record can indicate a cumulative amount of fuel consumed by the vehicle 120 at the end of the trip. The trip fuel record can be determined based on the fuel data collected from the final fuel data source. A trip distance record can indicate a cumulative distance traveled by the vehicle 120 at the end of the trip while the cumulative amount of fuel for the final fuel data source was tracked. The trip records can also be used by the fleet management system 110 to determine the fuel economy of the vehicle 120.

In some embodiments, the mid-trip and trip records may distinguish between fuel consumed by the vehicle 120 when the vehicle 120 was idling versus when the vehicle 120 was not idling. That is, the records may indicate the total amount of fuel consumed by the vehicle, the amount of fuel consumed by the vehicle 120 while the vehicle was idling, and/or the amount of fuel consumed by the vehicle 120 while the vehicle was not idling.

Reference will now be made to FIGS. 4A-E, which illustrate examples of various mid-trip and trip records that can be generated by a telematics device 130 and transmitted to a fleet management system 110 using method 300.

Figure 4A:
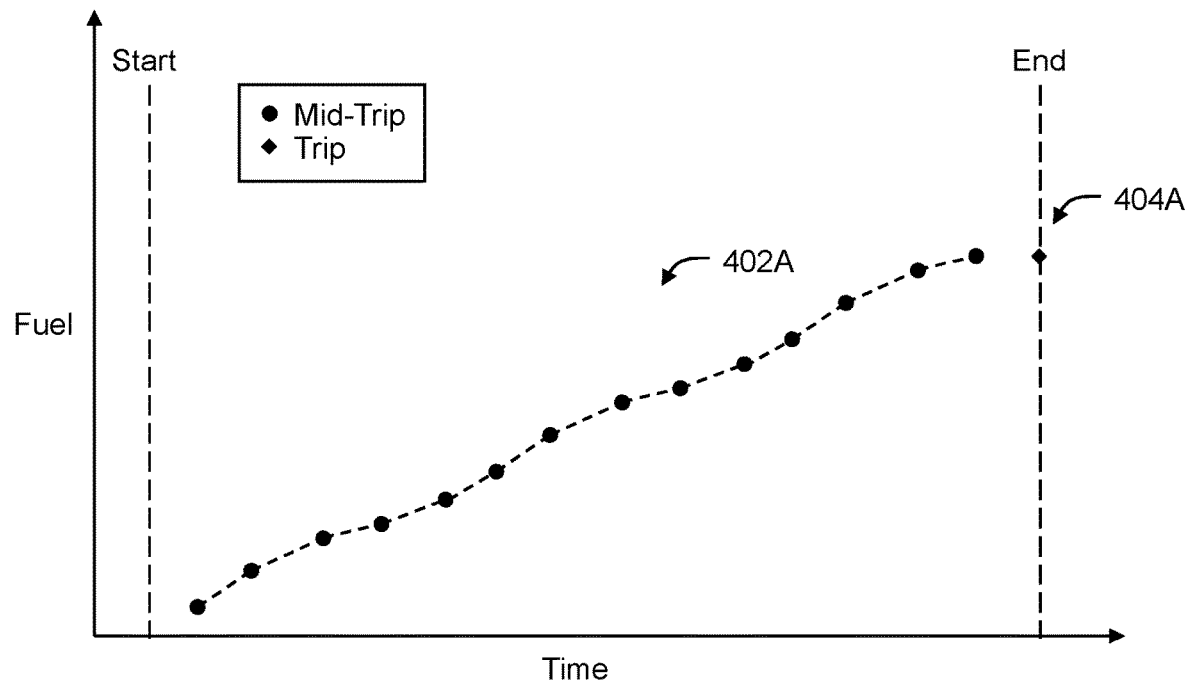
FIGS. 4A-4E are plots of various example mid-trip and trip fuel records, in accordance with an embodiment.

FIG. 4A illustrates an example where the initial fuel data source was detected near or at the start of the trip and the initial fuel data source is the same fuel data source as the final fuel data source. As shown, the trip fuel record 404A indicates the same amount of fuel consumed by the vehicle 120 at the end of the trip as the last mid-trip record 402A. In this scenario, an indication that the plurality of mid-trip fuel records 402A is valid can be transmitted to the fleet management system 110.

Figure 4B:
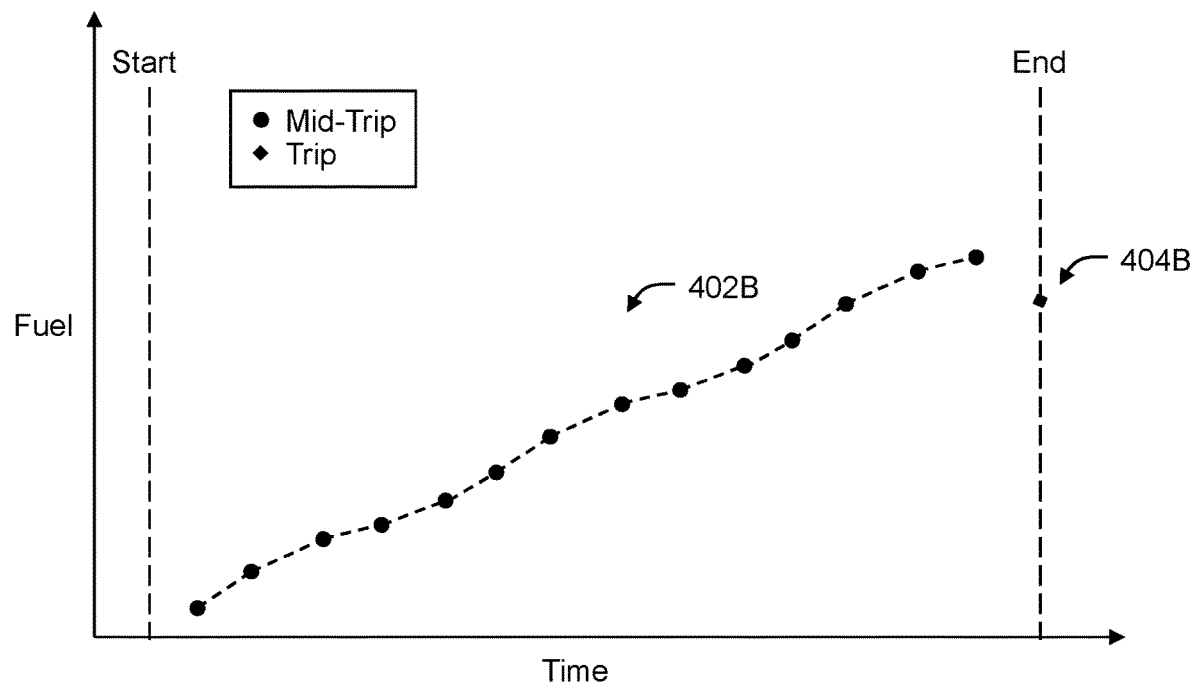

FIG. 4B illustrates an example where the initial fuel data source was detected near or at the start of the trip, but the initial fuel data source is not the same fuel data source as the final fuel data source. As shown, the trip fuel record 404B indicates a different amount of fuel consumed by the vehicle 120 at the end of the trip as the last mid-trip record 402B. In this scenario, an indication that the plurality of mid-trip fuel records 402B is not valid can be transmitted to the fleet management system 110. In some cases, an indication that the plurality of mid-trip fuel records 402B is valid can nevertheless be transmitted to the fleet management system 110, if the initial fuel data source was not invalidated prior to the end of the trip.

Figure 4C:
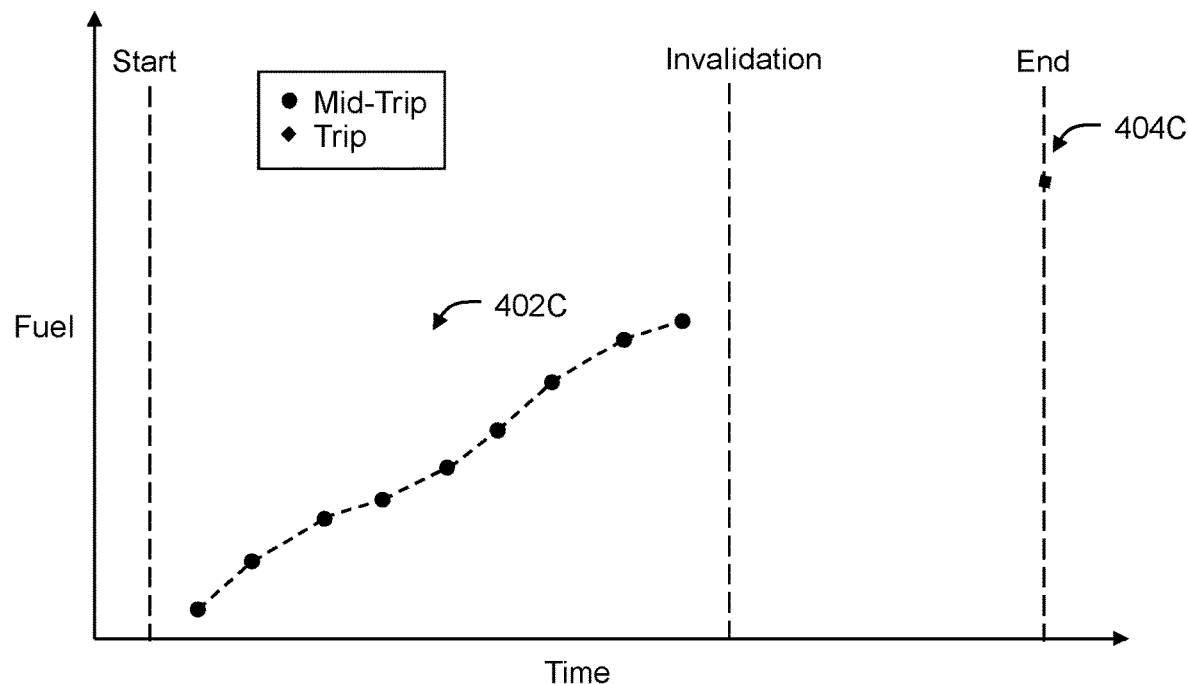

FIG. 4C illustrates an example where the initial fuel data source was detected near or at the start of the trip, but the initial fuel data source was invalidated prior to the end of the trip (e.g., when the confidence level of the initial fuel data source fell below a predetermined validation threshold). In the illustrated example, the mid-trip records 402C do not include records subsequent to the invalidation of the initial fuel data source. However, these is still a trip record 404C generated from a different fuel data source indicating the amount of fuel consumed at the end of the trip. In this scenario, an indication that the plurality of mid-trip fuel records 402C is not valid can be transmitted to the fleet management system 110.

Figure 4D:
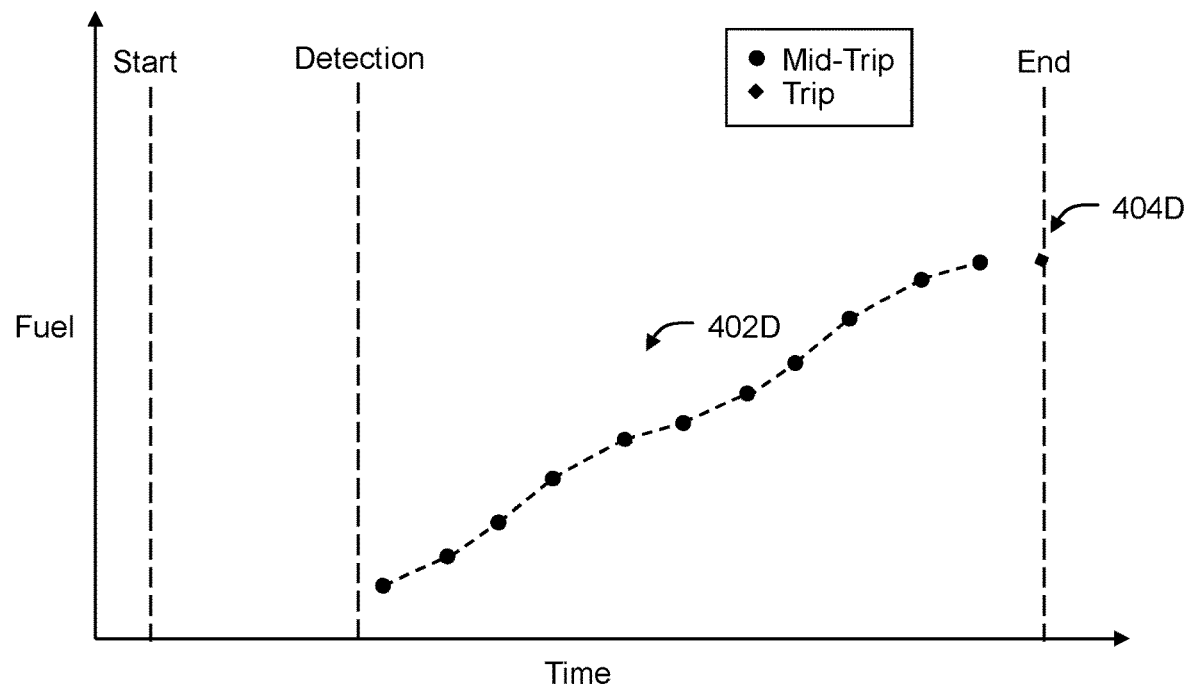

FIG. 4D illustrates an example where the initial fuel data source was detected subsequent to the beginning of the trip. In the illustrated example, the mid-trip records 402D do not include records prior to the initial fuel data source being detected, since fuel data from the initial fuel data source was not available prior to detection. In this scenario, an indication that the initial fuel data source was detected subsequent to the beginning of the trip can be transmitted to the fleet management system 110.

Figure 4E:
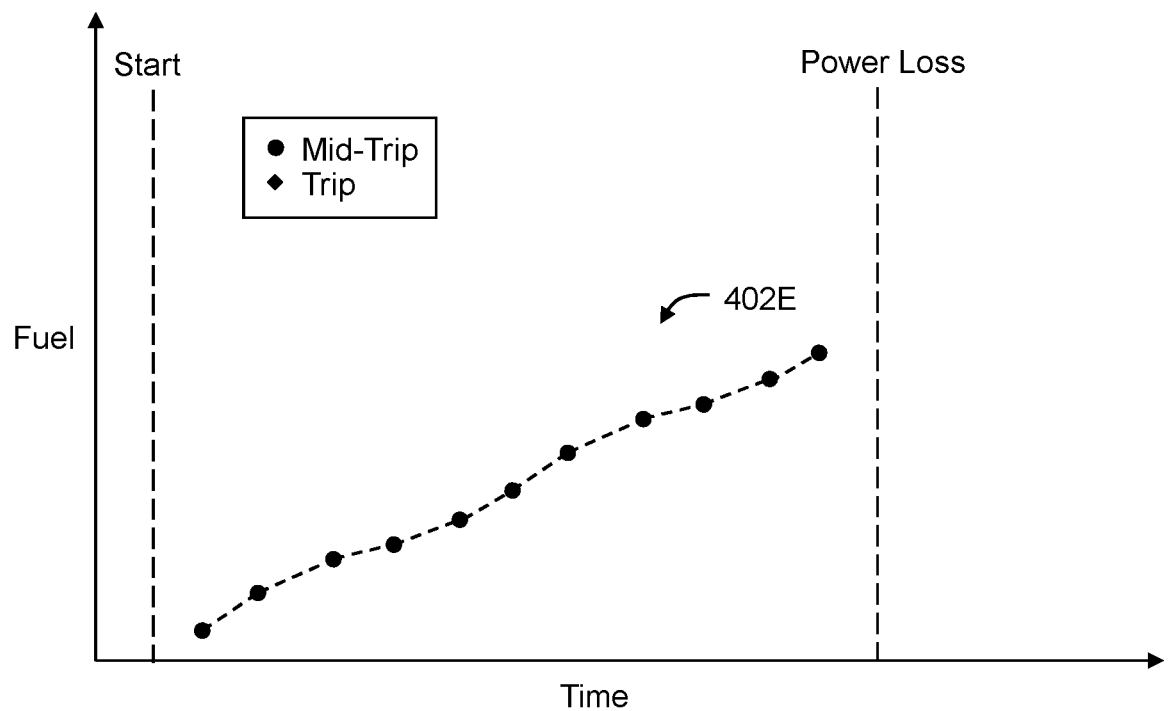

FIG. 4E illustrates an example where the initial fuel data source was detected near or at the start of the trip, but there was a power loss prior to the end of the trip. In the illustrated example, there is no trip record because no end of the trip was detected by the telematics device 130. In this scenario, an indication of whether the plurality of mid-trip fuel records 402E is valid may not be transmitted to the fleet management system 110. Instead, the fleet management system 110 may assume that the plurality of mid-trip fuel records 402E are valid because no indication to the otherwise was received from the telematics device 130.

Figure 5:
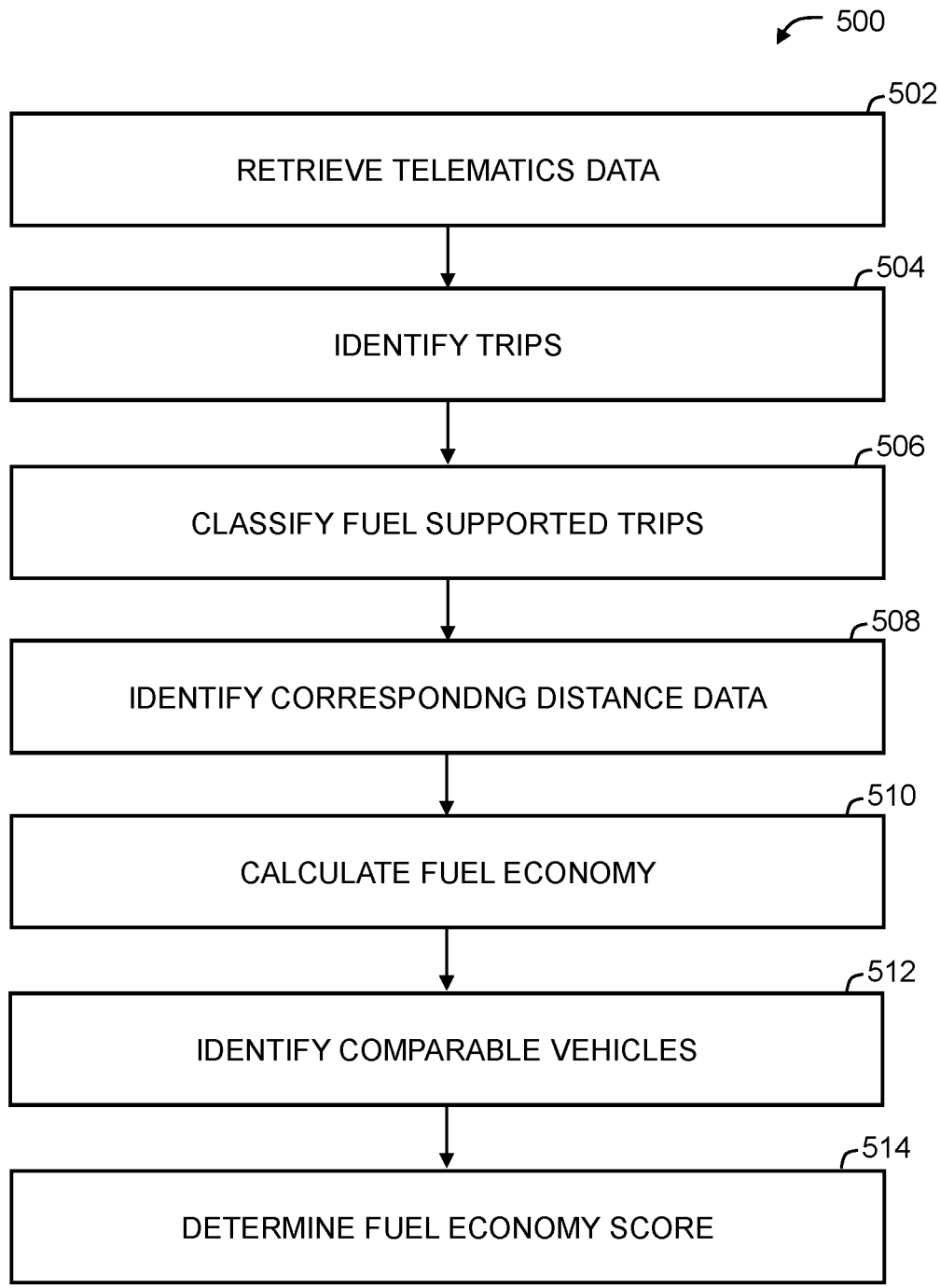
FIG. 5 is a flowchart of an example method for evaluating fuel consumption of a vehicle, in accordance with an embodiment.

Reference will now be made to FIG. 5, which illustrates an example method for evaluating fuel consumption of a vehicle 120. Method 500 can be implemented using a telematics device 130 (e.g., at least one processor 132) installed in the vehicle 120, a fleet management system 110 (e.g., at least one processor 112) remotely located from the telematics device 130 and vehicle 120, or a combination thereof. For example, method 500 can be implemented by processor 112 and/or processor 132 executing instructions stored on data storage 114 and/or data storage 134. An advantage of executing one or more steps of method 500 at the fleet management system 110 (i.e., remote from the telematics device 130) is that less processing may be completed at the telematic device 130. Hence, the hardware complexity and cost of the telematics device 130 can be reduced. Furthermore, it may be easier to update and/or modify software running on the fleet management system 110 as compared to the telematics device 130. An advantage of executing one or more steps of method 500 at the telematics device 130 (i.e., remote from the fleet management system 110) is that less data may be transmitted between the fleet management system 110 and the telematics device 130. Hence, network usage and bandwidth on the network 140 can be reduced. This may reduce usage costs associated with the network 140.

At 502, telematics data associated with the vehicle 120 can be retrieved. The telematics data may include any information, parameters, attributes, characteristics, and/or features associated with the vehicle 120, such as, but not limited to, fuel consumption data (e.g., indicating an amount of fuel consumed by the vehicle 120) and distance data (indicating an amount of distance by the vehicle 120). The telematics data may include the mid-trip and/or trip fuel and/or distance records described herein. The telematics data can be collected by a telematics device 130 installed in the vehicle 120 (i.e., through vehicle interface 124) and retrieved at the telematics device 130 and/or a fleet management system 110 (i.e., at data storages 114 and/or 134).

At 504, a plurality of trips completed by the vehicle can be identified. Each trip can be defined by an origin and a destination. During the trip, the vehicle can travel from the origin to the destination. The origin and destination may be the same location or different locations. The trip can encompass any amount of time or distance. Each trip can be associated with a portion of the telematics data collected during the trip. Telematics data can be collected at any point during the trip, including the origin and the destination. Telematics data can be collected continuously, regularly, or intermittently during the trip.

The plurality of trips can be identified based on the telematics data. The trips can be identified in various ways. In some cases, the trips can be identified based on ignition events in the telematics data. That is, the origins and destinations can be identified based on when the ignition of the vehicle 120 was turned on and off respectively. In other cases, the trips can be identified based on distance or speed events in the telematics data. That is, the origins and destinations can be defined based on the motion (or lack thereof) of the vehicle 120.

At 506, at least some of the plurality of trips can be classified as fuel supported trips. The portion of the telematics data associated with each fuel supported trip can include fuel consumption data. The fuel consumption data can represent an amount of fuel consumed by the vehicle 120 during at least a portion of the trip. The fuel consumption data may include the mid-trip and/or trip fuel records described herein. In many cases, fuel consumption data may not be available for each trip. For example, invalidation of a fuel data source, late detection of a fuel data source, and power loss of the telematics device 130 during a trip can each result in fuel consumption data being unavailable for that trip. Each fuel supported trip can represent a trip for which fuel consumption data is available.

The fuel supported trips can be identified in various ways. In some cases, a trip can be classified as a fuel supported trip if the portion of the telematics data associated that trip contains any fuel consumption data. The presence of fuel consumption data can be determined by detecting the actual fuel consumption data itself or another indicator in the telematics data that indicates that the fuel consumption data exists. In other cases, a trip can be classified as a fuel supported trip if the portion of the telematics data associated that trip contains fuel consumption data and the fuel consumption data is valid. The validity of the fuel consumption data can be determined by detecting an indicator in the telematics data that indicates that the fuel consumption data is valid or by directly analyzing the fuel consumption data (e.g., evaluating the correlation of the fuel consumption data with another related parameter).

At 508, distance data can be identified from the portion of the telematics data associated with each fuel supported trip. The distance data can represent an amount of distance traveled by the vehicle 120 during the at least a portion of the trip. For example, the distance data can include GPS data and/or odometer data. The distance data may include the mid-trip and/or trip distance records described herein. The distance data can correspond to the fuel consumption data. That is, the distance data can represent the amount of distance traveled by the vehicle 120 during which the amount of fuel consumed by the vehicle 120 represented by the fuel consumption data was consumed. The distance data may or may not be substantially cotemporaneous to the corresponding fuel consumption data.

At 510, a fuel economy of the vehicle 120 can be calculated. The fuel economy can be calculated based on the fuel consumption data and the distance data of each fuel supported trip. The fuel economy can be calculated by dividing the total amount of distance traveled by the vehicle 120 by the total amount of fuel consumed by the vehicle 120, or vice versa. Using the fuel consumption data and distance data associated with fuel supported trips can provide a more accurate calculation of fuel economy. Without classifying fuel trips, overestimation of fuel economy may occur when fuel consumption data is not available for every trip.

At 512, a plurality of comparable vehicles 120 can be identified. Each comparable vehicle 120 can have at least one shared vehicle characteristic with the vehicle 120. For example, the shared vehicle characteristics may include, but are not limited to: vocation (e.g., taxi, courier, long haul, etc.), fuel type (e.g., gasoline, diesel, etc.), weight class (e.g., gross vehicle weight rating (GVWR) classes 1-8, light duty, medium duty, heavy duty, etc.), and/or engine characteristic (e.g., engine displacement, horsepower, number of cylinders, cylinder orientation, etc.). Each comparable vehicle 120 can also be equipped with a telematics device 130. In some cases, the comparable vehicles 120 can be identified based on telematics data collected from the comparable vehicles 120.

At 514, a fuel economy score of the vehicle 120 can be determined. The fuel economy score can be determined based on differences between the fuel economy of the vehicle 120 and a fuel economy of each comparable vehicle in the plurality of comparable vehicles. The fuel economy score can have any format, such as, but not limited to, a number (e.g., 1-10, 0-100, etc.), letter (e.g., A-F), or boolean (e.g., pass/fail). The fuel economy of each comparable vehicle can be determined in a similar manner as the vehicle 120 (e.g., steps 502 to 510 can be executed for each comparable vehicle in the plurality of comparable vehicles).

The fuel economy score can be calculated in various ways. In some embodiments, the fuel economy score can be determined based on a percentile rank of the fuel economy of the vehicle 120 in relation to the fuel economy of each comparable vehicle 120. In some cases, the fuel economy score can simply be the percentile rank of the vehicle 120. For example, if the fuel economy of the vehicle 120 is in the 10th percentile of comparable vehicles 120, the vehicle 120 may be assigned a fuel economy score of 10. In other cases, the fuel economy score may be a function of the percentile rank of the vehicle 120. For example, if the fuel economy of the vehicle 120 is in the $10^{th}$ percentile of comparable vehicles 120, the vehicle 120 may be assigned a fuel economy score of 90 (i.e., 100-90).

An advantage of the fuel economy score that it can provide a more informative evaluation of the fuel efficiency of the vehicle 120 as compared to traditional fuel economy calculations. In contrast to traditional fuel economy calculations, the fuel economy score can take into consideration the relative efficiency of the vehicle 120 in relation to comparable vehicles 120. This can remove some confounding and obfuscating factors, such as, but not limited to, vocation, weight, and/or engine characteristics of the vehicle 120. By removing these factors, the fuel economy score can provide various insights into the behaviour of driver of the vehicle 120, the status of the vehicle 120, the geographic area in which the vehicle is driven, and more. These insights may not be discernable when considering traditional fuel economy calculations alone.

The fuel economy score of the vehicle 120 can be used in a variety of ways. Preferable, the fuel economy score can be used in combination with other data relating to the vehicle 120 to provide additional insights. The fuel economy score can be used to that provide additional context that would not otherwise be available with the other data alone. For instance, in some cases, the fuel economy score can be used to assess idling of the vehicle 120. For example, an amount of idling performed by the vehicle 120 during the at least a portion of each fuel supported trip can be determined based on the telematics data. If the fuel economy health score and the amount of idling exceed a predetermined idling threshold, a warning indicating the amount of idling can be generated. In other cases, the fuel economy score can be used to assess aggressive driving of the vehicle 120. For example, an amount of aggressive driving performed by the vehicle 120 during the at least a portion of each fuel supported trip can be determined based the telematics data. If the fuel economy health score and the amount of aggressive driving exceed a predetermined aggressive driving threshold, a warning indicating the amount of aggressive driving can be generated. In other cases, the fuel economy score can be used to identify mechanical issues of the vehicle 120. For example, an amount of idling and an amount of aggressive driving performed by the vehicle 120 during the at least a portion of each fuel supported trip can be determined based the telematics data. A mechanical issue of the vehicle 120 can be identified based on the fuel economy health score, the amount of idling, and the amount of aggressive driving.

Figure 6:
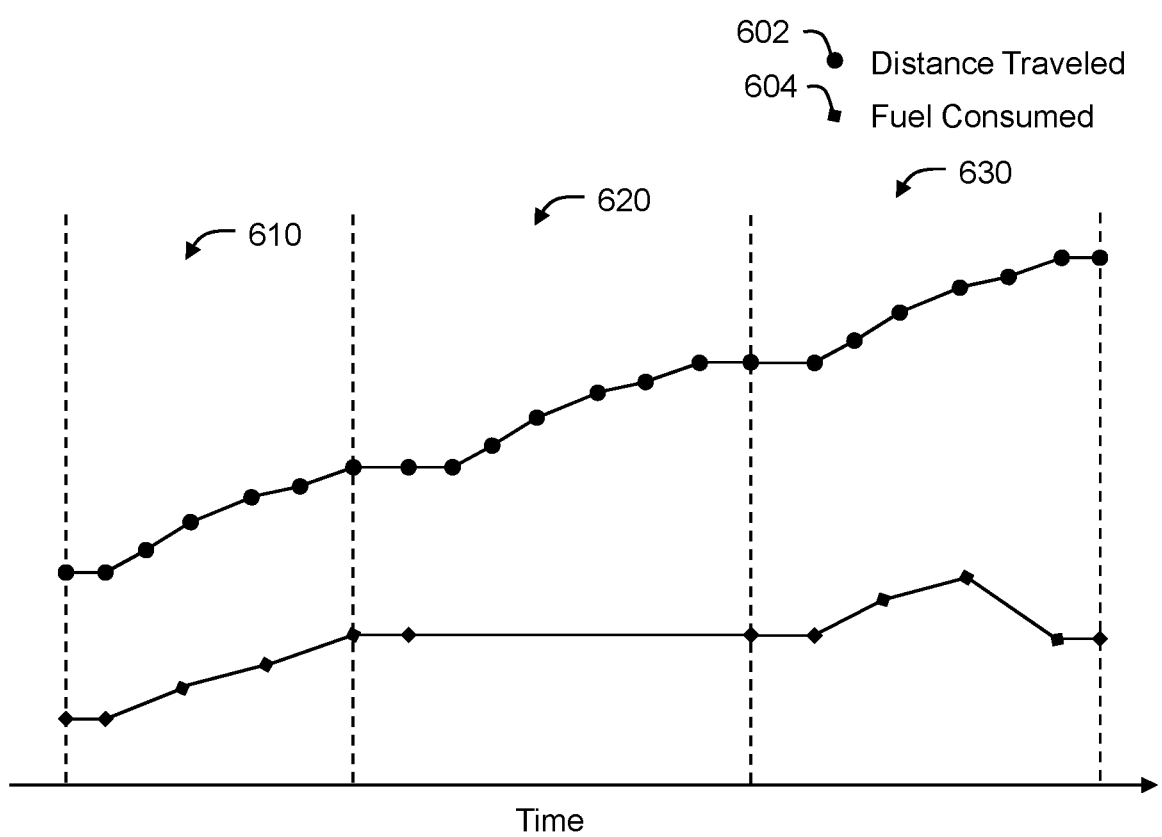
FIG. 6 is a plot of example fuel consumption and distance data, in accordance with an embodiment.

Referring now to FIG. 6, there is shown example distance data 602 and fuel consumption data 604 that was collected by a telematics device 130 during a first trip 610, a second trip 620, and a third trip 630 completed by a vehicle 120. In the illustrated example, valid distance and fuel consumption data 602, 604 was collected during the first trip 610. However, during the second trip 620, fuel consumption data 604 was not recorded. Similarly, during the third trip 630, there was an error in the fuel consumption data 602 causing the fuel consumption to decrease over time. If the fuel economy of the vehicle 120 calculated using the distance and fuel consumption data 602, 604 from all three trips 610, 620, 630, the resulting calculation would overestimate the fuel economy of the vehicle 120. However, by classifying fuel supported trips and identifying corresponding fuel consumption data using method 500, the fuel economy and fuel economy score of the vehicle 120 can be calculated with greater precision.

It should be appreciated that although various fuel economies and fuel economy scores are described with reference to the amount of the distance traveled by a vehicle 120, fuel economies and fuel economy scores may be calculated using the amount of time elapsed while the fuel was consumed, in some embodiments. It should also be appreciated that fuel consumption data may refer the total amount of fuel consumed by the vehicle, the amount of fuel consumed by the vehicle 120 while the vehicle was idling, and/or the amount of fuel consumed by the vehicle 120 while the vehicle was not idling, depending on the context.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for tracking fuel consumption of a vehicle, the method comprising operating a telematics device installed in the vehicle to:
   transmit a plurality of requests for fuel data to a plurality of fuel data sources of the vehicle via at least one vehicle interface during a trip completed by the vehicle, each fuel data source in the plurality of fuel data sources corresponding to at least one internal sensor of the vehicle;
   receive, in response to the plurality of requests, the fuel data requested from the each fuel data source via the at least one vehicle interface;
   track, during the trip, for the each fuel data source, a cumulative amount of fuel consumed by the vehicle determined based on the fuel data requested and received from the each fuel data source and the at least one internal sensor corresponding to the each fuel data source;
   determine a confidence level of the each fuel data source in the plurality of fuel data sources at a plurality of points in the trip based on a correlation between the cumulative amount of fuel consumed by the vehicle and an additional property of the vehicle measured by the telematics device via the at least one vehicle interface;
   identify an initial fuel data source from the plurality of fuel data sources;
   generate a plurality of mid-trip fuel records, each mid-trip fuel record indicating the cumulative amount of fuel consumed by the vehicle at a point in the trip determined based on the fuel data requested and received from the initial fuel data source;
   identify a final fuel data source from the plurality of fuel data sources based on a priority of the each fuel data source and the confidence level of the each fuel data source;
   determine whether the plurality of mid-trip fuel records is valid based on whether the initial fuel data source is a same fuel data source as the final fuel data source; and
   transmit the plurality of mid-trip fuel records and an indication of whether the plurality of mid-trip fuel records is valid to a fleet management system.

2. The method of claim 1, further comprising operating the telematics device to:
   generate a plurality of mid-trip distance records, each mid-trip distance record indicating a cumulative amount of distance traveled by the vehicle at a point in the trip while the cumulative amount of fuel for the initial fuel data source was tracked; and
   transmit the plurality of mid-trip distance records to the fleet management system.

3. The method of claim 1, further comprising operating the telematics device to:
   generate a trip fuel record, the trip fuel record indicating a cumulative amount of fuel consumed by the vehicle at the end of the trip, the trip fuel record being determined based on the fuel data requested and received from the final fuel data source; and
   transmit the trip fuel record to the fleet management system.

4. The method of claim 3, further comprising operating the telematics device to:
   generate a trip distance record, the trip distance record indicating a cumulative distance traveled by the vehicle at the end of the trip while the cumulative amount of fuel for the final fuel data source was tracked; and
   transmit the trip distance record to the fleet management system.

5. The method of claim 1, further comprising operating the telematics device to:
   identify one or more fuel data sources having a confidence level exceeding a predetermined validation threshold as one or more validated fuel data sources; and
   identify a validated fuel data source having the highest priority as the initial fuel data source.

6. The method of claim 1, wherein identifying the initial fuel data source comprises identifying a previous final fuel data source from a previous trip as the initial fuel data source.

7. The method of claim 1, wherein identifying the final fuel data source comprises:
   determining an overall confidence level for the each fuel data source based on the confidence level for the each fuel data source at each point in the plurality of points; and
   identifying a fuel data source having the highest priority and an overall confidence level exceeding a predetermined validation threshold as the final fuel data source.

8. The method of claim 1, wherein the confidence level of the final fuel data source exceeds a predetermined validation threshold at each point in the plurality of points.

9. The method of claim 1, further comprising operating the telematics device to:
   determine that the confidence level for the initial fuel data source is below a predetermined validation threshold at at least one point in the trip; and
   determine that the plurality of mid-trip fuel records is not valid.

10. The method of claim 1, further comprising operating the telematics device to:
    determine that the initial fuel data source was detected subsequent to the beginning of the trip;
    wherein the indication of whether the plurality of mid-trip fuel records is valid indicates the initial fuel data source was identified subsequent to the beginning of the trip.

11. A non-transitory computer readable medium having instructions stored thereon executable by at least one processor to implement a method for tracking fuel consumption of a vehicle, the method comprising operating a telematics device installed in the vehicle to:
    transmit a plurality of requests for fuel data to a plurality of fuel data sources of the vehicle via at least one vehicle interface during a trip completed by the vehicle, each fuel data source in the plurality of fuel data sources corresponding to at least one internal sensor of the vehicle;
    receive, in response to the plurality of requests, the fuel data requested from the each fuel data source via the at least one vehicle interface;
    track, during the trip, for the each fuel data source, a cumulative amount of fuel consumed by the vehicle determined based on the fuel data requested and received from the each fuel data source and the at least one internal sensor corresponding to the each fuel data source;
    determine a confidence level of the each fuel data source in the plurality of fuel data sources at a plurality of points in the trip based on a correlation between the cumulative amount of fuel consumed by the vehicle and an additional property of the vehicle measured by the telematics device via the at least one vehicle interface;
identify an initial fuel data source from the plurality of fuel data sources;
generate a plurality of mid-trip fuel records, each mid-trip fuel record indicating the cumulative amount of fuel consumed by the vehicle at a point in the trip determined based on the fuel data requested and received from the initial fuel data source;
identify a final fuel data source form the plurality of fuel data sources based on a priority of the each fuel data source and the confidence level of the each fuel data source;
determine whether the plurality of mid-trip fuel records is valid based on whether the initial fuel data source is a same fuel data source as the final fuel data source; and
transmit the plurality of mid-trip fuel records and an indication of whether the plurality of mid-trip fuel records is valid to a fleet management system.

12. A telematics device comprising:
at least one processor operable to:
transmit a plurality of requests for fuel data to a plurality of fuel data sources of a vehicle via at least one vehicle interface during a trip completed by the vehicle, each fuel data source in the plurality of fuel data sources corresponding to at least one internal sensor of the vehicle;
receive, in response to the plurality of requests, the fuel data requested from the each fuel data source via the at least one vehicle interface;
track, during the trip, for the each fuel data source, a cumulative amount of fuel consumed by the vehicle determined based on the fuel data requested and received from the each fuel data source and the at least one internal sensor corresponding to the each fuel data source;
determine a confidence level of the each fuel data source in the plurality of fuel data sources at a plurality of points in the trip based on the fuel data a correlation between the cumulative amount of fuel consumed by the vehicle and an additional property of the vehicle measured by the at least one processor via the at least one vehicle interface;
identify an initial fuel data source from the plurality of fuel data sources;
generate a plurality of mid-trip fuel records, each mid-trip fuel record indicating the cumulative amount of fuel consumed by the vehicle at a point in the trip determined based on the fuel data requested and received from the initial fuel data source;
identify a final fuel data source from the plurality of fuel data sources based on a priority of the each fuel data source and the confidence level of the each fuel data source;
determine whether the plurality of mid-trip fuel records is valid based on whether the initial fuel data source is a same fuel data source as the final fuel data source; and
transmit the plurality of mid-trip fuel records and an indication of whether the plurality of mid-trip fuel records is valid to a fleet management system.

13. The telematics device of claim 12, wherein the at least one processor is operable to:
generate a plurality of mid-trip distance records, each mid-trip distance record indicating a cumulative amount of distance traveled by the vehicle at a point in the trip while the cumulative amount of fuel for the initial fuel data source was tracked; and
transmit the plurality of mid-trip distance records to the fleet management system.

14. The telematics device of claim 12, wherein the at least one processor is operable to:
generate a trip fuel record, the trip fuel record indicating a cumulative amount of fuel consumed by the vehicle at the end of the trip, the trip fuel record being determined based on the fuel data requested and received from the final fuel data source; and
transmit the trip fuel record to the fleet management system.

15. The telematics device of claim 14, wherein the at least one processor is operable to:
generate a trip distance record, the trip distance record indicating a cumulative distance traveled by the vehicle at the end of the trip while the cumulative amount of fuel for the final fuel data source was tracked; and
transmit the trip distance record to the fleet management system.

16. The telematics device of claim 12, wherein the at least one processor is operable to:
identify one or more fuel data sources having a confidence level exceeding a predetermined validation threshold as one or more validated fuel data sources; and
identify a validated fuel data source having the highest priority as the initial fuel data source.

17. The telematics device of claim 12, wherein identifying the initial fuel data source comprises identifying a previous final fuel data source from a previous trip as the initial fuel data source.

18. The telematics device of claim 12, wherein identifying the final fuel data source comprises:
determining an overall confidence level for the each fuel data source based on the confidence level for the each fuel data source at each point in the plurality of points; and
identifying a fuel data source having the highest priority and an overall confidence level exceeding a predetermined validation threshold as the final fuel data source.

19. The telematics device of claim 12, wherein the confidence level of the final fuel data source exceeds a predetermined validation threshold at each point in the plurality of points.

20. The telematics device of claim 12, wherein the at least one processor is operable to:
determine that the confidence level for the initial fuel data source is below a predetermined validation threshold at at least one point in the trip; and
determine that the plurality of mid-trip fuel records is not valid.

21. The telematics device of claim 12, wherein the at least one processor is operable to:
determine the initial fuel data source was detected subsequent to the beginning of the trip;
wherein the indication of whether the plurality of mid-trip fuel records is valid indicates the initial fuel data source was identified subsequent to the beginning of the trip.

* * * * *